(12) United States Patent
Wong et al.

(10) Patent No.: US 11,198,496 B2
(45) Date of Patent: Dec. 14, 2021

(54) FIXED MOUNT ELECTRIC ACTUATOR FOR A MARINE STEERING SYSTEM, AND A PROPULSION UNIT COMPRISING THE SAME

(71) Applicant: Marine Canada Acquisition Inc., Richmond (CA)

(72) Inventors: Ray Tat Lung Wong, Richmond (CA); Dave Higgs, Vancouver (CA); Noam Davidson, Vancouver (CA)

(73) Assignee: Marine Canada Acquisition Inc., Richmond (CA)

( * ) Notice: Subject to any disclaimer, the term of this patent is extended or adjusted under 35 U.S.C. 154(b) by 128 days.

(21) Appl. No.: 16/789,975

(22) Filed: Feb. 13, 2020

(65) Prior Publication Data

US 2020/0255114 A1    Aug. 13, 2020

Related U.S. Application Data (60) Provisional application No. 62/805,887, filed on Feb. 14, 2019, provisional application No. 62/805,307, filed on Feb. 13, 2019.

(51) Int. Cl.
| | | |
|---|---|---|
| *B63H 25/24* | (2006.01) | |
| *B63H 25/10* | (2006.01) | |
| *B63H 20/12* | (2006.01) | |
| *B63H 20/10* | (2006.01) | |

(52) U.S. Cl.
CPC ........... *B63H 25/24* (2013.01); *B63H 20/10* (2013.01); *B63H 20/12* (2013.01); *B63H 25/10* (2013.01)

(58) Field of Classification Search
CPC ...... B63H 20/08; B63H 20/10; B63H 20/106; B63H 20/12; B63H 25/10; B63H 25/14; B63H 25/24; H02K 7/06; F16H 25/20; F16H 2025/204; F16H 2025/2043; F16H 25/2247; F16H 25/2252; F16H 2025/2075; F16H 2025/2078
See application file for complete search history.

(56) References Cited

U.S. PATENT DOCUMENTS

| | | | | |
|---|---|---|---|---|
| 5,255,882 | A * | 10/1993 | Schroppel | F16H 25/2015 244/3.24 |
| 5,499,547 | A * | 3/1996 | Nagai | B23Q 1/58 108/143 |
| 5,557,154 | A * | 9/1996 | Erhart | F04B 7/00 310/68 B |
| 8,281,728 | B2 | 10/2012 | Washino | |
| 8,419,488 | B2 * | 4/2013 | Ooshita | B63H 25/02 440/59 |
| 9,509,203 | B1 * | 11/2016 | Lee | H02K 5/22 |
| 9,944,377 | B2 | 4/2018 | Davidson | |
| 10,518,858 | B1 * | 12/2019 | Klawitter | B63H 20/12 |

* cited by examiner

*Primary Examiner* — Ajay Vasudeva
(74) *Attorney, Agent, or Firm* — Berenato & White, LLC (57) ABSTRACT

The propulsion unit comprises an electric actuator and a tiller coupled the electric actuator. The electric actuator includes a housing having a first end and second end. There is an output shaft fully received within the housing. The output shaft includes a coupling portion and a tiller is coupled the coupling portion of the output shaft such that such that a line of action of the actuator is in the same plane as the tiller.

24 Claims, 8 Drawing Sheets

FIXED MOUNT ELECTRIC ACTUATOR FOR A MARINE STEERING SYSTEM, AND A PROPULSION UNIT COMPRISING THE SAME

BACKGROUND OF THE INVENTION

Field of the Invention

The present invention relates to an electric actuator and, in particular, to an electric actuator for a marine steering system, as well as a propulsion unit comprising the same.

Description of the Related Art

U.S. Pat. No. 9,944,377 which was published on Apr. 17, 2018, in the name of Davidson et al., and the full disclosure of which is incorporated herein by reference, discloses a marine steering system comprising a propulsion unit including a tilt tube, a support rod received by the tilt tube, a tiller, and an electric actuator for imparting steering movement to the propulsion unit. The electric actuator includes a housing and an output shaft reciprocatingly received by the housing. The output shaft is partially threaded and has smooth surfaces. There is a motor disposed within the housing. The motor includes a stator and a rotor. Rotation of the rotor causes the output shaft to translate axially relative to the rotor and causes the output shaft to reciprocate relative to the housing. A pivot plate is pivotably connected to the tiller of the propulsion unit. The pivot plate rotationally constrains the housing of the electric actuator to provide reaction torque for rotation of the rotor. There are support arms which connect respective ends of the output shaft to the support rod of the propulsion unit. The support arms provide rotational constraint to the output shaft and the support arms inhibit axial movement of the output shaft relative to the marine vessel while the housing of the electric actuator reciprocates linearly along the output shaft.

SUMMARY OF THE INVENTION

There is provided an electric actuator for a marine steering system. The electric actuator includes a housing having a first end and second end. There is an output shaft fully received within the housing. The output shaft includes a first end, a second end, and a coupling portion disposed between the first end and the second end. There is a roller screw assembly disposed within the housing near the first end of the housing. The roller screw assembly includes a plurality of rollers and a central screw received by the rollers. The rollers are rotatable about the central screw and the central screw is coupled to the output shaft. There is a motor disposed within the housing near the first end of the housing. The motor including a stator and a rotor. The rotor has an axial bore which engages with the rollers of the roller screw assembly. Rotation of the rotor causes the roller screw assembly to translate axially relative to rotor and the output shaft to reciprocate within the housing. There may be a guide bushing disposed within the housing near the motor. The guide bushing may reciprocatingly receiving the output shaft. There may be a guide bushing disposed within the housing near the second end of the housing. The guide bushing may reciprocatingly receive the output shaft. The coupling portion of the output shaft may include a tiller extension. The motor may be concentric to the roller screw assembly.

There is also provided a propulsion unit for a marine steering system. The propulsion unit comprises an electric actuator and a tiller coupled to the electric actuator. The electric actuator includes a housing having a first end and second end. There is an output shaft fully received within the housing. The output shaft includes a first end, a second end, and a coupling portion disposed between the first end and the second end. The tiller is coupled to the coupling portion of the output shaft such that such that a line of action of the actuator is in the same plane as the tiller. There is a roller screw assembly disposed within the housing near the first end of the housing. The roller screw assembly includes a plurality of rollers and a central screw received by the rollers. The rollers are rotatable about the central screw and the central screw is coupled to the output shaft. There is a motor disposed within the housing near the first end of the housing. The motor includes a stator and a rotor. The rotor has an axial bore which engages with the rollers of the roller screw assembly. Rotation of the rotor causes the roller screw assembly to translate axially relative to the rotor and the output shaft to reciprocate within the housing. There may be a guide bushing disposed within the housing near the motor. The guide bushing may reciprocatingly receive the output shaft. There may be a guide bushing disposed within the housing near the second end of the housing. The guide bushing may reciprocatingly receive the output shaft. The coupling portion of the output shaft may include a tiller extension. The electric actuator may be bolted to the propulsion unit and an interior of the electric actuator may be sealed. The tiller may be bolted to the propulsion unit by a bolt and there may be a resilient insert about the bolt. The motor may be concentric to the roller screw assembly.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
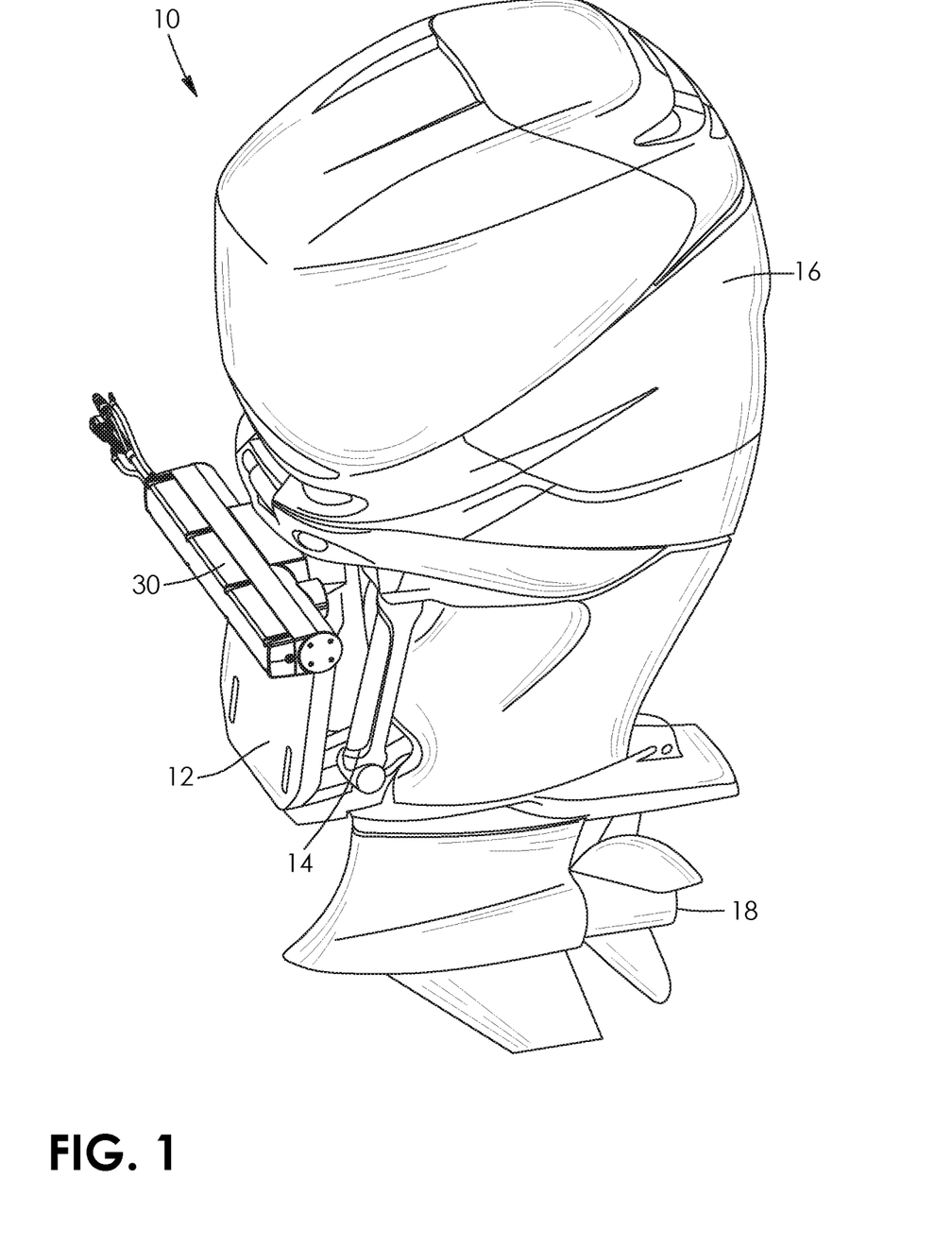
FIG. 1 is a perspective view of a propulsion unit for a marine vessel and an electric actuator mounted on the propulsion unit.
Figure 2:
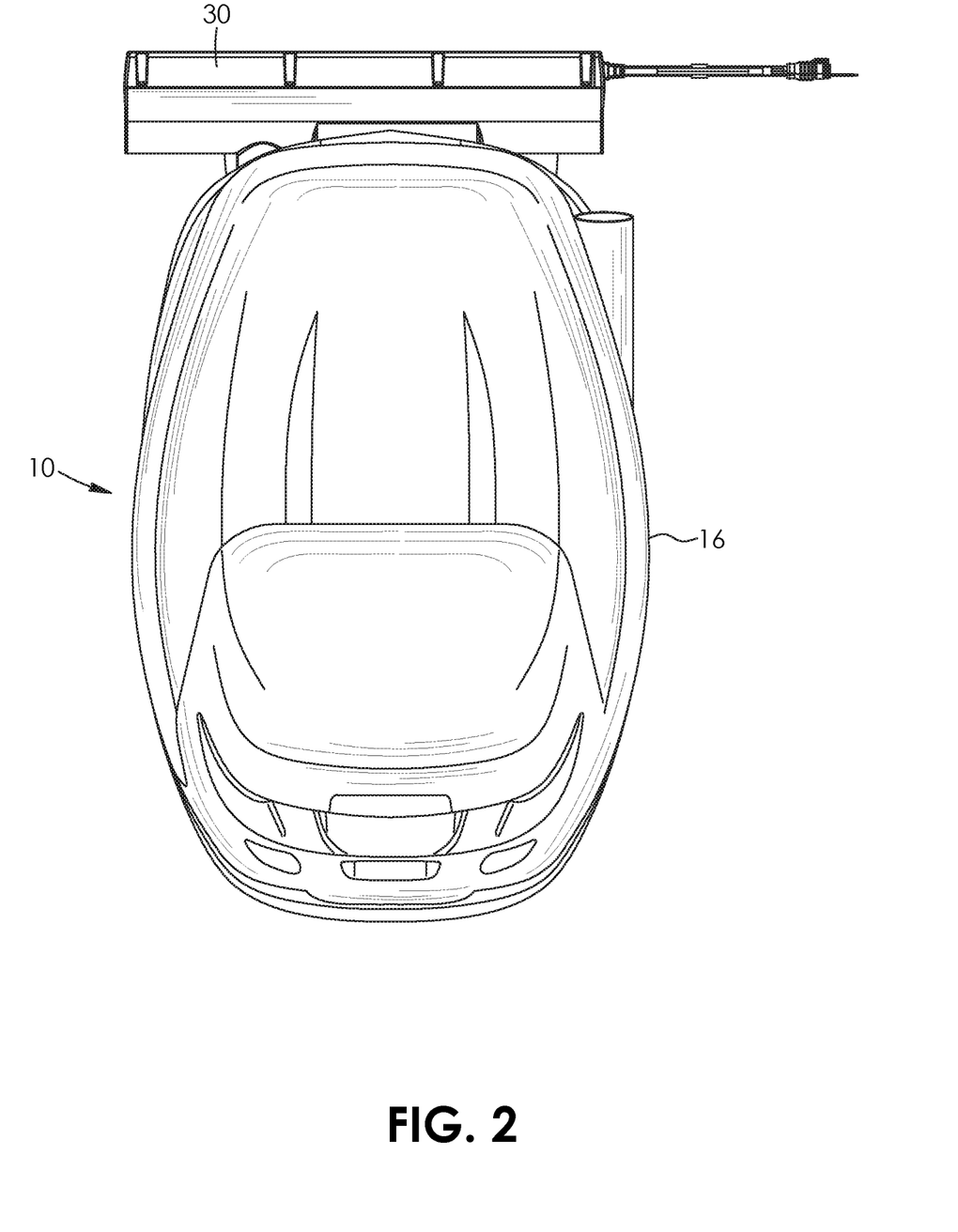
FIG. 2 is a top plan view of the propulsion unit and the electric actuator of FIG. 1.

Referring to the drawings and first to FIG. 1, there is shown a propulsion unit 10 for a marine vessel (not shown). The propulsion unit 10 generally comprises a mounting bracket 12 for mounting the propulsion unit 10 to the marine vessel. The propulsion unit includes a swivel bracket assembly 14 for steering, trimming and tilting the propulsion unit 10 relative to the marine vessel. The propulsion unit 10 includes an engine 16 for powering the propulsion unit 10 and a propeller 18 for imparting a thrust to the marine vessel. There is also an electric actuator 30 which is mounted on the propulsion unit. In this example, and as best shown in FIG. 2, the electric actuator 30 is mounted asymmetrically on the propulsion unit 10. The propulsion unit shown in FIGS. 1 and 2 is an outboard engine. However, the propulsion unit 10 may be any suitable marine propulsion unit such as, for example, an inboard engine or a stern drive.

Figure 3:
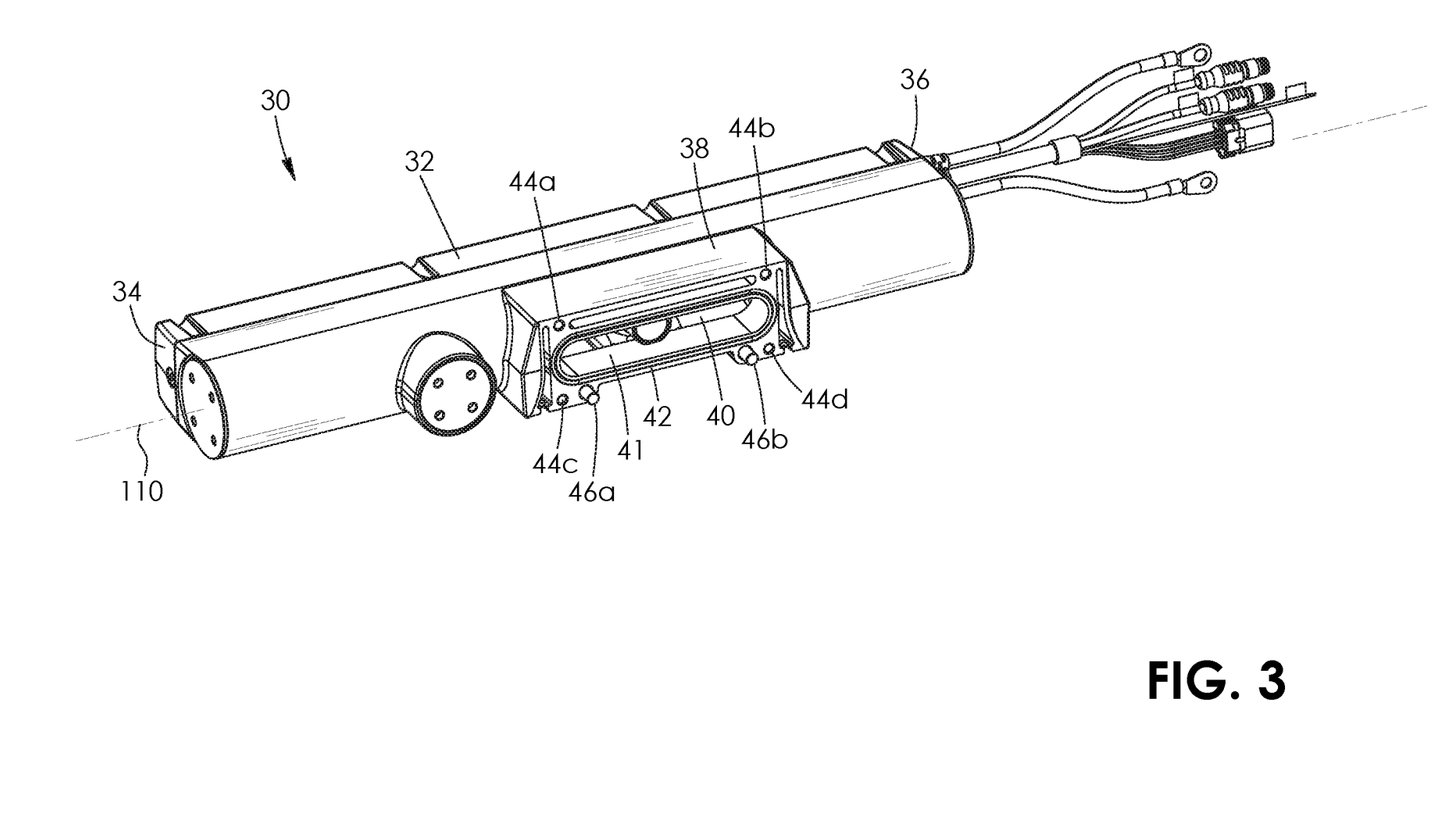
FIG. 3 is a perspective view of the electric actuator of FIG. 1.

The electric actuator 30 is shown in greater detail in FIG. 3. The electric actuator 30 has a housing 32 which has a first end 34 and a second end 36. There is a mounting subassembly 38 extending radially relative to a longitudinal axis 110 of the electric actuator 30. The mounting subassembly includes an aperture 40 which allows access to an interior 41 of the housing 32. There is a seal 42 disposed about the aperture 40 so that the interior of the housing is sealed when the electric actuator 30 is mounted to the propulsion unit 10. The mounting subassembly 38 also includes a plurality of threaded apertures 44a, 44b, 44c, and 44d which allow the electric actuator 30 to be bolted to the propulsion unit 10 as shown in FIGS. 1 and 2. Referring back to FIG. 3, the mounting subassembly further includes dowel pins 46a and 46b which enable the electric actuator to be aligned with the propulsion unit prior to bolting the electric actuator 30 to the propulsion unit, as described above.

Figure 4:
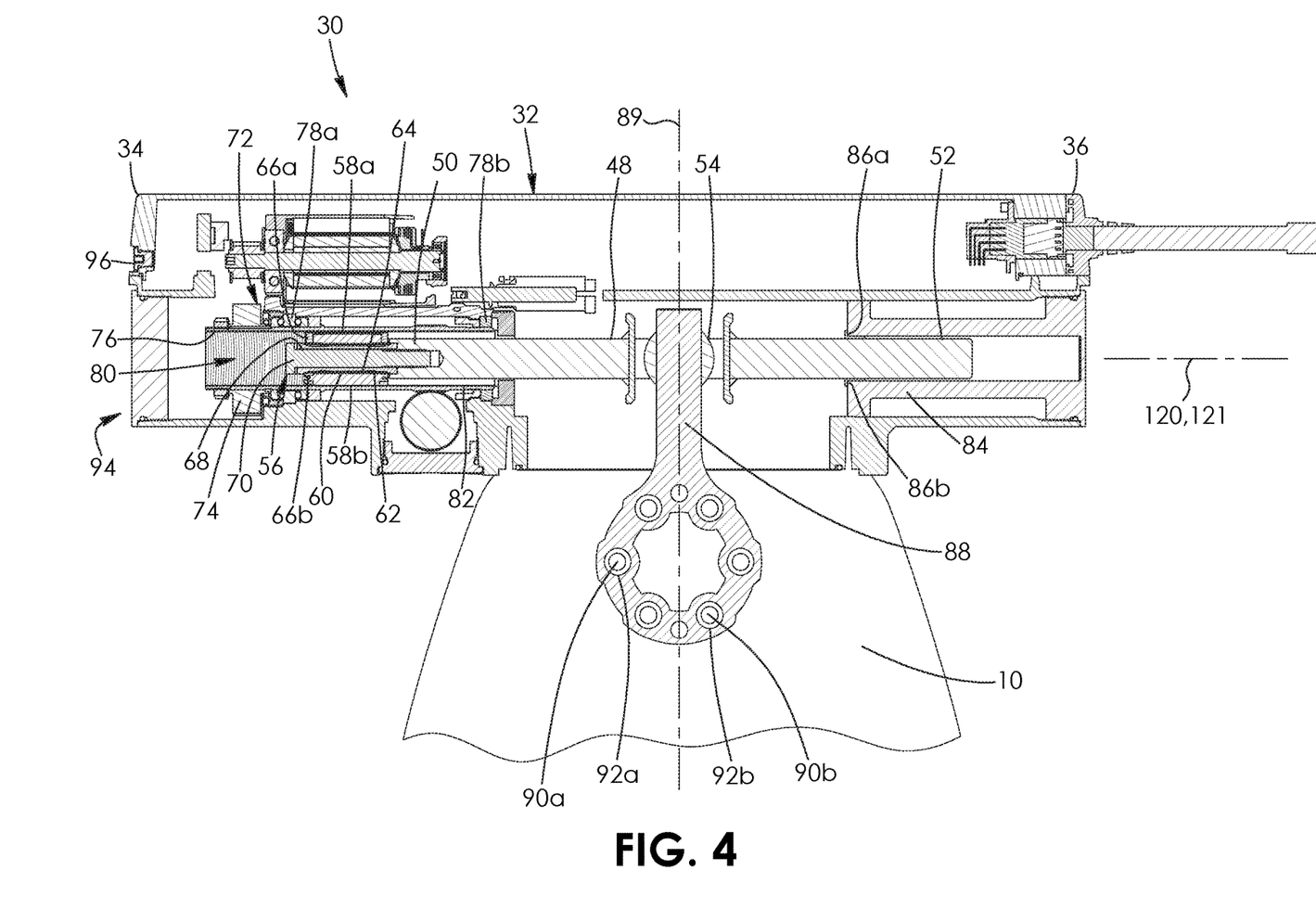
FIG. 4 is a sectional view of the electric actuator of FIG. 1.
Figure 4A:
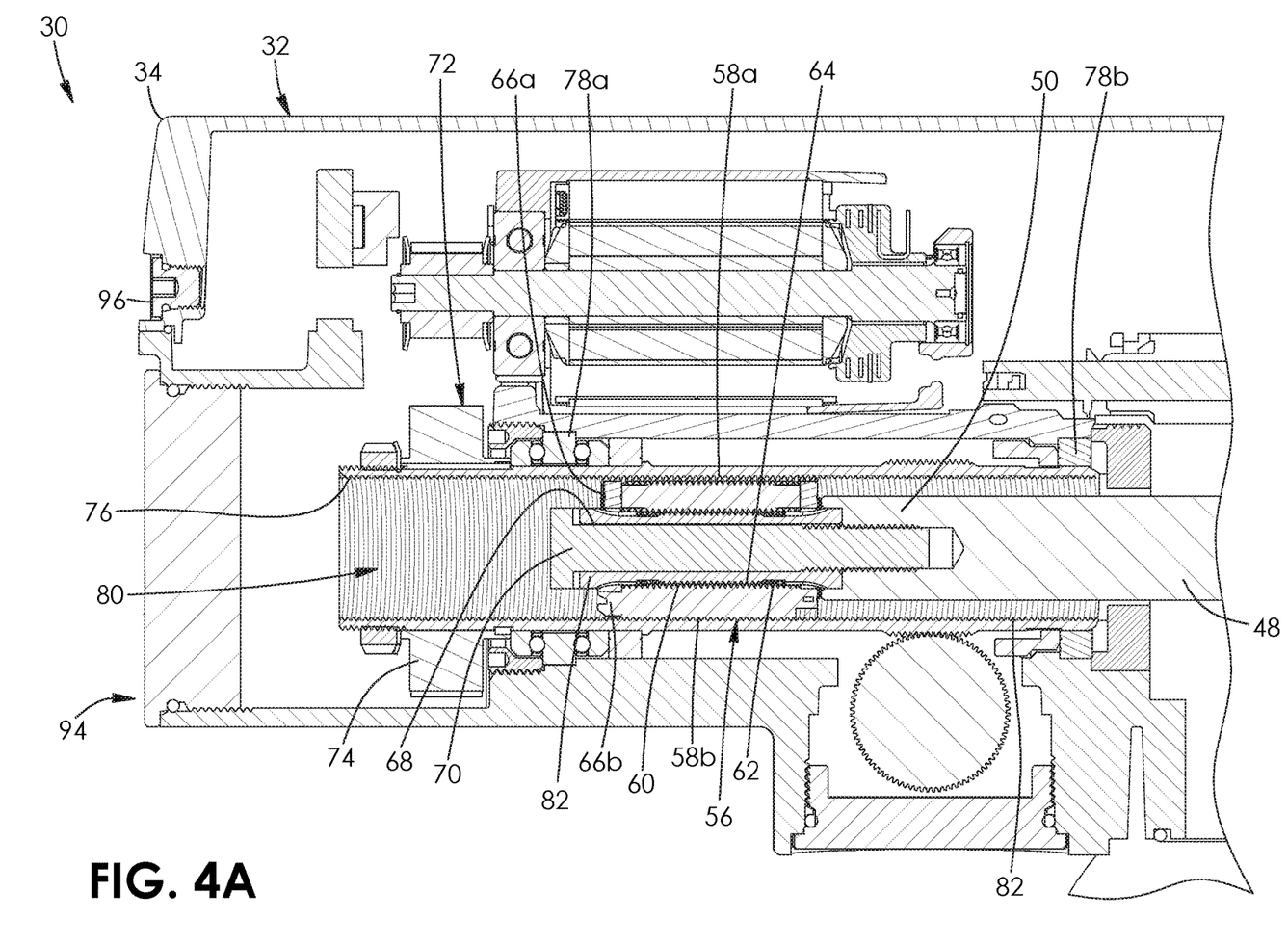
FIG. 4A is an enlarged partial sectional view of the electric actuator of FIG. 1.

Referring now to FIGS. 4 and 4A, the electric actuator 30 includes an output shaft 48 which is fully received and sealed within the housing 32 when the housing is mounted to the propulsion unit 10. This protects the output shaft from the environment and reduces the need for advanced corrosion protection. The output shaft 48 includes a first end 50, a second end 52, and a coupling portion 54 disposed between the first end 50 of the output shaft 48 and the second end 52 of the output shaft 48.

As seen in FIG. 4A, the output shaft is coupled to a roller screw assembly 56 which is disposed within the housing 32 near the first end 34 of the housing 32. The roller screw assembly includes a plurality of rollers arranged in an annular configuration, for example rollers 58a and 58b, and a central screw 60. The rollers are rotatable about the central screw in a planetary fashion but do not translate axially relative to the central screw. Alignment of the rollers 58a and 58b and the central screw 60 is maintained through the use of respective interlocking gear teeth 62 and 64 on the rollers 58a and 58b and the central screw 60. There are annular end plates 66a and 66b which hold the roller screw assembly 56 together. The end plates 66a and 66b are free to rotate relative to the central screw 60 and the end plates 66a and 66b are each provided with journal bearing bores (not shown) that allow the rollers 58a and 58b to rotate independently of the end plates 66a and 66b.

The central screw 60 is provided with an axial through bore 68. A bolt 70 extends through the axial through bore of the central screw, and threadedly engages the first end 50 of the output shaft 48 to couple the roller screw assembly 56 to the output shaft 48. However, in other examples, the central screw and the output shaft may be a unitary construction, such as in the form of a traditional acme screw, for example.

Still referring to FIG. 4A, there is a motor 72 disposed within the housing 32 near the first end 34 of the housing 32. The motor 72 is a DC brushless electric motor, in this example, and includes a stator 74 and a rotor 76. The rotor 76 is constrained axially within the housing 32 but is able to rotate through the provision of bearings 78a and 78b disposed at opposite ends of the rotor 76. The rotor has a threaded axially through bore 80 which threadedly engages the rollers 58a and 58b. Rotation of the rotor 76 relative to the roller screw assembly 56 causes the roller screw assembly to translate axially relative to the rotor and the output shaft 48 to reciprocate within the housing 32.

There is a guide bushing 82 disposed within the housing 32 near the motor 72. The guide bushing 82 reciprocatingly receives the output shaft 48. As seen in FIG. 4, there is also a guide bushing 84 disposed near the second end 36 of housing 32. The guide bushing 84 also reciprocatingly receives the output shaft 48. There are apertures 86a and 86b in the guide bushing to enable or facilitate air flow between the first end of 34 of the housing 32 and a second end 36 of the housing 32 as well as through a center of the housing.

Still referring to FIG. 4, a tiller 88 of the propulsion unit 10 is coupled the coupling portion 54 of the output shaft 48. The tiller has a longitudinal axis 89. The guide bushings 82 and 84 support the output shaft on either side of the tiller to reduce side loads. The tiller 88 is coupled to the output shaft 48 such that line of action 120 of the output shaft of the electric actuator 30 is in the same plane as the tiller axis 89 through the entire steering range. The axis 121 of the output shaft intersects the axis of the tiller through the entire steering range. This minimizes turning moment (torque couple) on the roller screw assembly 56. This is advantageous because any torque couple causing an overturning moment to the roller screw assembly decreases efficiency and derates load carrying capacity. The tiller 88 is mounted on the propulsion unit 10 by a plurality of attachment bolts, for example attachments bolts 90a and 90b. Each said bolt is surrounded by a respective resilient insert, for example resilient insert 92a and 92b, which provide compliance. More specifically, the resilient inserts function as a safeguard against shock loading and damage to contacting surfaces.

The electric actuator 30 is also provided with manual override mechanisms. A tool (not shown) may be inserted through access port 94 to manually rotate the roller screw assembly 56 to manually reposition the propulsion unit 10. A tool (not shown) may also be inserted through access port 96 to manually rotate the motor 72 so as to manually reposition the propulsion unit 10 at a reduced ratio.

Figure 5:
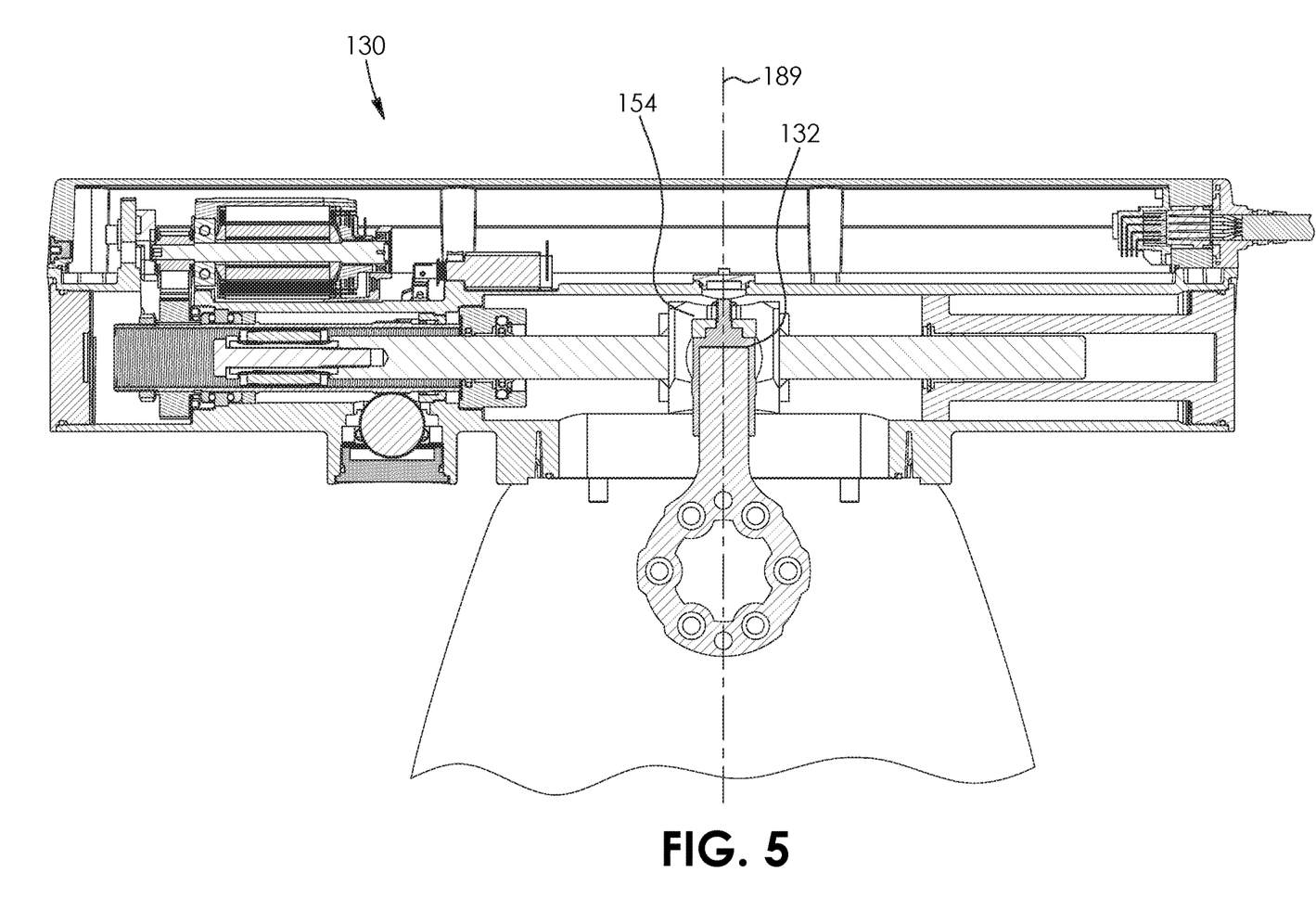
FIG. 5 is a sectional view similar to FIG. 4 of another embodiment of an electric actuator similar to the electric actuator of FIG. 1.

FIG. 5 shows another embodiment of an electric actuator 130. The electric actuator 130 shown in FIG. 5 is generally identical to the electric actuator shown 30 in FIGS. 1 to 4 with the notable exception that there is a tiller extension 132 mounted on the coupling portion 54. The tiller extension allows the electric actuator 130 to be mounted to any propulsion unit to provide a higher mechanical advantage. A spacer (not shown) may optionally be employed to provide an equal tiller extension amount. The spacer may be of resilient material to provide shock absorption. The tiller extension 132 or the spacer provide adjustment to fit a variety of propulsion units. For example, the electric actuator 130 may be mounted to a propulsion unit during the manufacture of the propulsion unit, or the electric actuator may be mounted to an in-service propulsion unit as a retrofit.

Figure 6:
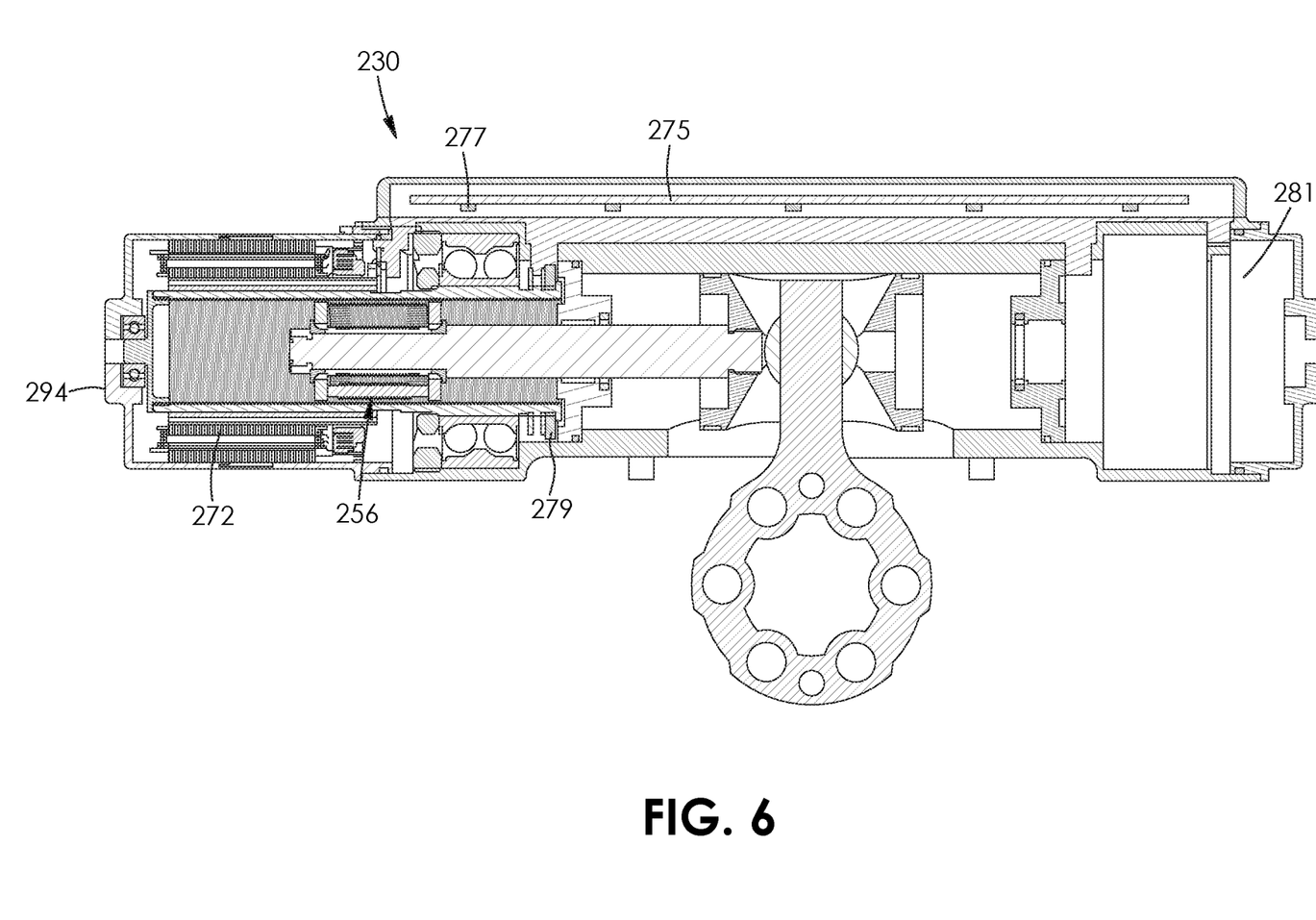
FIG. 6 is a sectional view similar to FIG. 4 of yet another embodiment of an electric actuator similar to the electric actuator of FIG. 1.

FIG. 6 shows another embodiment of an electric actuator 230. The electric actuator shown in FIG. 6 is similar to the electric actuator 30 shown in FIGS. 1 to 4 with the notable exception that electric actuator 230 includes a motor 272 that is concentric to the roller screw assembly 256. The electric actuator includes a controller 275 and an actuator position sensor, in this example a linear magnetoresistive absolute position sensor 277. The electric actuator 230 further includes a brake 279 and a chamber 281 for an additional motor and roller screw (not shown).

Figure 7:
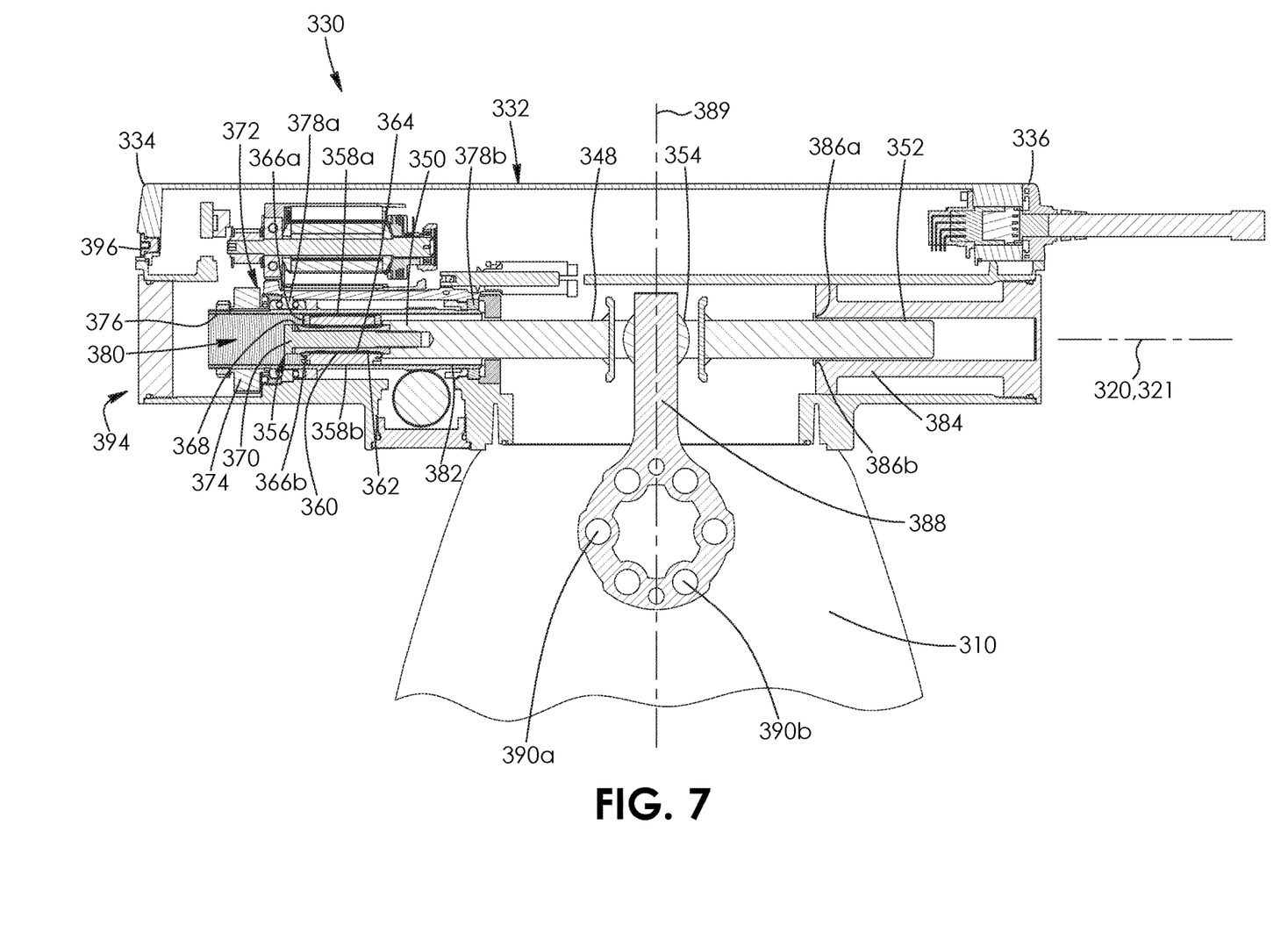
FIG. 7 is a sectional view similar to FIG. 4 of a further embodiment of an electric actuator similar to the electric actuator of FIG. 1.

FIG. 7 shows a further embodiment of an electric actuator 330. The electric actuator shown in FIG. 7 is generally identical to the electric actuator 30 shown in FIGS. 1 to 4 with the notable exception that instead of resilient inserts 92*a* and 92*b*, the coupling portion 354 is made of resilient material to provide similar shock absorption.

It will be understood by a person skilled in the art that while the electric actuators disclosed herein comprise a roller screw assembly, in other examples, the electric actuator may comprises any suitable screw assembly with a drive screw. It will also be understood by a person skilled in the art that many of the details provided above are by way of example only, and are not intended to limit the scope of the invention which is to be determined with reference to the following claims.

What is claimed is:

1. An electric actuator for a marine steering system, the electric actuator comprising:
    a housing having first and second ends;
    an output shaft fully received within the housing, the output shaft having first and second ends and including a coupling portion disposed between the first end thereof and the second end thereof;
    a roller screw assembly disposed within the housing near the first end of the housing, the roller screw assembly including a plurality of rollers and a central screw received by the rollers, the rollers being rotatable about the central screw and the central screw coupling to the output shaft; and
    a motor disposed within the housing near the first end of the housing, the motor including a stator and a rotor, the rotor having an axial bore which engages with the rollers of the roller screw assembly, wherein rotation of the rotor causes the roller screw assembly to translate axially relative to the rotor and the output shaft to reciprocate within the housing.

2. The electric actuator as claimed in claim 1 further including a guide bushing disposed within the housing near the motor, the guide bushing reciprocatingly receiving the output shaft.

3. The electric actuator as claimed in claim 1 further including a guide bushing disposed within the housing near the second end of the housing, the guide bushing reciprocatingly receiving the output shaft.

4. The electric actuator as claimed in claim 1 further including a guide bushing reciprocatingly receiving the output shaft, the guide bushing having at least one aperture to enable air flow between the first end of the housing and the second end of the housing.

5. The electric actuator as claimed in claim 1 wherein the coupling portion of the output shaft includes a tiller extension.

6. The electric actuator as claimed in claim 1 wherein an interior of the electric actuator is sealed.

7. The electric actuator as claimed in claim 1 wherein the motor is concentric to the roller screw assembly.

8. The electrical actuator as claimed in claim 1 wherein the coupling portion is resilient at least in part.

9. In combination, the electric actuator as claimed in claim 1 and a tiller, the tiller having a tiller axis and being coupled to the output shaft such that a line of action of the output shaft is in the same plane as the tiller axis throughout the entire steering range.

10. In combination, the electric actuator as claimed in claim 1 and a tiller, the tiller being coupled to the output shaft such that the axis of the output shaft intersects the axis of the tiller through the entire steering range.

11. A propulsion unit for a marine steering system, the propulsion unit comprising an electric actuator and a tiller coupled the electric actuator, the electric actuator including:
    a housing having first and second ends;
    an output shaft fully received within the housing, the output shaft having first and second ends, and including a coupling portion disposed between the first end thereof and the second end thereof, the tiller being coupled the coupling portion of the output shaft such that a line of action of the electric actuator is in the same plane as the tiller;
    a roller screw assembly disposed within the housing near the first end of the housing, the roller screw assembly including a plurality of rollers and a central screw received by the rollers, the rollers being rotatable about the central screw and the central screw coupling to the output shaft; and
    a motor disposed within the housing near the first end of the housing, the motor including a stator and a rotor, the rotor having an axial bore which engages with the rollers of the roller screw assembly, wherein rotation of the rotor causes the roller screw assembly to translate axially relative to the rotor and the output shaft to reciprocate within the housing.

12. The propulsion unit as claimed in claim 11 wherein the electric actuator further includes a guide bushing disposed within the housing near the motor, the guide bushing reciprocatingly receiving the output shaft.

13. The propulsion unit as claimed in claim 11 wherein the electric actuator further includes a guide bushing disposed within the housing near the second end of the housing, the guide bushing reciprocatingly receiving the output shaft.

14. The propulsion unit as claimed in claim 11 wherein the electric actuator further includes a guide bushing reciprocatingly receiving the output shaft, the guide bushing having at least one aperture to enable air flow between the first end of the housing and the second end of the housing.

15. The propulsion unit as claimed in claim 11 wherein the electric actuator further includes a pair of guide bushings which support the output shaft on either side of the tiller to reduce side loads.

16. The propulsion unit as claimed in claim 11 wherein the coupling portion of the output shaft includes a tiller extension.

17. The propulsion unit as claimed in claim 11 wherein the coupling portion is resilient at least in part.

18. The propulsion unit as claimed in claim 11 wherein the tiller resiliently couples to the propulsion unit.

19. The propulsion unit as claimed in claim 11 wherein the electric actuator is bolted to the propulsion unit and wherein an interior of the electric actuator is sealed.

20. The propulsion unit as claimed in claim 11 wherein the tiller is bolted to the propulsion unit by a bolt and there is a resilient insert about the bolt.

21. The propulsion unit as claimed in claim 20 wherein the motor is concentric to the roller screw assembly.

22. An electric actuator for a marine steering system, the electric actuator comprising:
    a housing having first and second ends;
    an output shaft fully received within the housing, the output shaft having first and second ends, and including a coupling portion disposed between the first end thereof and the second end thereof;

a screw assembly disposed within the housing near the first end of the housing, the screw assembly including a drive screw, the drive screw coupling to the output shaft; and a motor disposed within the housing near the first end of the housing, the motor including a stator and a rotor, the rotor having an axial bore which engages with the screw assembly, wherein rotation of the rotor causes the screw assembly to translate axially relative to the rotor and the output shaft to reciprocate within the housing.

23. The electric actuator as claimed in claim 22 wherein the motor is concentric to the screw assembly.

24. The electrical actuator as claimed in claim 22 wherein the coupling portion is resilient at least in part.

* * * * *